(12) United States Patent
Yokoyama et al.

(10) Patent No.: US 7,288,013 B2
(45) Date of Patent: Oct. 30, 2007

(54) METHOD OF FORMING MICROSTRUCTURES ON A SUBSTRATE AND A MICROSTRUCTURED ASSEMBLY USED FOR SAME

(75) Inventors: Chikafumi Yokoyama, Zama (JP); Takaki Sugimoto, Komae (JP)

(73) Assignee: 3M Innovative Properties Company, St. Paul, MN (US)

( * ) Notice: Subject to any disclaimer, the term of this patent is extended or adjusted under 35 U.S.C. 154(b) by 623 days.

(21) Appl. No.: 10/698,200

(22) Filed: Oct. 31, 2003

(65) Prior Publication Data

US 2005/0093202 A1 May 5, 2005

(51) Int. Cl.
*H01J 9/00* (2006.01)
(52) U.S. Cl. .......................................... 445/23; 264/313
(58) Field of Classification Search ............ 445/23–25, 445/49–51
See application file for complete search history.

(56) References Cited

U.S. PATENT DOCUMENTS

| | | | |
|---|---|---|---|
| 5,136,207 A | 8/1992 | Miyake et al. | |
| 5,175,030 A | 12/1992 | Lu et al. | |
| 5,183,597 A | 2/1993 | Lu | |
| 5,352,478 A | 10/1994 | Miyake et al. | |
| 5,601,468 A | 2/1997 | Fujii et al. | |
| 5,703,433 A | 12/1997 | Fujii et al. | |
| 5,853,446 A | 12/1998 | Carre et al. | |
| 5,992,320 A | 11/1999 | Kosaka et al. | |
| 6,247,986 B1 | 6/2001 | Chiu et al. | |
| 6,352,763 B1 | 3/2002 | Dillon et al. | |
| 2003/0022585 A1 | 1/2003 | Kikuchi et al. | |
| 2003/0098528 A1 | 5/2003 | Chiu et al. | |
| 2003/0100192 A1 | 5/2003 | Chiu | |
| 2005/0253290 A1* | 11/2005 | Yokoyama et al. ........ 264/1.1 |

FOREIGN PATENT DOCUMENTS

| | | |
|---|---|---|
| JP | 1-285332 | 11/1989 |
| JP | 3-9301 | 1/1991 |
| JP | 4-131835 | 5/1992 |
| JP | 9-12336 | 1/1997 |
| JP | 9-283017 | 10/1997 |
| JP | 2000-21303 | 1/2000 |
| JP | 2000137442 | 5/2000 |
| JP | 2002055624 | 2/2002 |
| WO | WO 01/20636 | 3/2001 |
| WO | WO 2004/007166 | 1/2004 |
| WO | WO 2004/010452 | 1/2004 |
| WO | WO 2004/043664 | 5/2004 |

* cited by examiner

*Primary Examiner*—Joseph Williams
(74) *Attorney, Agent, or Firm*—Carolyn A. Fischer (57) ABSTRACT

A method of forming microstructures on a substrate is disclosed. A microstructured assembly that may be used in the method for forming microstructures on a substrate is also disclosed. The methods and assemblies of the present disclosure can reduce the amount of air entrapped in barrier ribs formed on substrates used in Plasma Display devices.

17 Claims, 3 Drawing Sheets

METHOD OF FORMING MICROSTRUCTURES ON A SUBSTRATE AND A MICROSTRUCTURED ASSEMBLY USED FOR SAME

The present disclosure generally relates to microstructured assemblies. More specifically, the present disclosure relates to methods of forming microstructures on a substrate that are substantially devoid of bubbles.

BACKGROUND

Advancements in display technology, including the development of plasma display panels (PDPs) and plasma addressed liquid crystal (PALC) displays, have led to an interest in forming electrically-insulating ceramic barrier ribs on glass substrates. The ceramic barrier ribs separate cells in which an inert gas can be excited by an electric field applied between opposing electrodes. The gas discharge emits ultraviolet (uv) radiation within the cell. In the case of PDPs, the interior of the cell is coated with a phosphor that gives off red, green, or blue visible light when excited by uv radiation. The size of the cells determines the size of the picture elements (pixels) in the display. PDPs and PALC displays can be used, for example, as the displays for high definition televisions (HDTV) or other digital electronic display devices.

One way in which ceramic barrier ribs can be formed on glass substrates is by direct molding, which involves laminating a planar rigid mold onto a substrate with a glass- or ceramic-forming composition disposed therebetween. The glass- or ceramic-forming composition is then solidified and the mold is removed. Finally, the barrier ribs are fused or sintered by firing at a temperature of about 550° C. to about 1600° C. The glass- or ceramic-forming composition has micrometer-sized particles of glass frit dispersed in an organic binder. The use of an organic binder allows barrier ribs to be solidified in a green state so that firing fuses the glass particles in position on the substrate. However, in applications such as PDP substrates, highly precise and uniform barrier ribs with few or no defects or fractures are required. These requirements can pose challenges, especially during removal of the rigid mold from the green state ribs.

PDP ribs are typically arranged in one of two pattern types. One type is referred to as a "straight pattern." This straight pattern is simple and can be relatively easily manufactured on a large scale.

A flexible resin mold can be used to mold ribs having the straight pattern. The resin mold is manufactured in the following way. First, a photosensitive resin is filled into a metal master mold having the same pattern and the same shape as those of the rib pattern to be manufactured. Next, this photosensitive resin is covered with a plastic film and is cured to integrate the photosensitive resin after curing with the film. The film is then released with the photosensitive resin from the metal master mold to form a flexible resin mold.

Another rib pattern type is referred to as a "lattice pattern." The lattice pattern can be used to improve the vertical resolution of a PDP compared to the straight pattern, because ultraviolet rays from the discharge display cell are better confined and are hence less likely to leak to adjacent cells. In addition, the phosphors can be applied to a relatively greater area of the discharge display cell when lattice pattern ribs are employed.

Methods have previously been described that enable molding and formation of ceramic microstructures such as straight or lattice rib patterns on a patterned substrate. For example, U.S. Pat. No. 6,247,986 B1 to Chiu et al., entitled METHOD FOR PRECISE MOLDING AND ALIGNMENT OF STRUCTURES ON A SUBSTRATE USING A STRETCHABLE MOLD, and U.S. Patent Publication No. 2003/0098528 A1 to Chiu et al., entitled METHOD OF FORMING MICROSTRUCTURES ON A SUBSTRATE USING A MOLD, describe the molding and aligning of ceramic barrier rib microstructures on an electrode-patterned substrate. Such ceramic barrier rib microstructures may be particularly useful in electronic displays, such as PDPs and PALC displays, in which pixels are addressed or illuminated via plasma generation between opposing substrates.

Although a mold can be used to manufacture ribs having the lattice pattern, the removal of a rigid mold typically results in damage to the ribs. A flexible mold as described herein can be applied to molding lattice pattern ribs so that damage to the ribs may be avoided. According to existing molding technology, however, it is difficult to manufacture a mold that eliminates the problem of rib damage upon mold removal. In addition to problems with rib damage upon de-molding, it is preferred not to entrap air bubbles within the mold. Large air bubbles can result in defects large enough to effectively interrupt the continuity of the ribs. Small air bubbles are not as disruptive, but their presence is not preferred.

For the lattice pattern, damage to the lateral ribs (those lying perpendicular to the axis of removal of the flexible mold) is a problem. In addition, the rib material needs to have a sufficiently high viscosity such that it maintains the rib shape after removal of the mold. However, since high viscosity material has low flowability, air bubbles in lateral grooves of the mold are difficult to eliminate completely.

SUMMARY

In general, the invention is directed to a method for forming microstructures on a substrate. The invention is further directed to a microstructured assembly that may be used with the disclosed method.

One advantage of this disclosure is that air bubbles can be removed using a method that employs only one application of pressure from a roller or the like in only the first direction, in contrast to a two-step application method which would also include a second application of pressure from a roller or the like traveling in the second direction. It is another advantage of this invention that air bubbles can be so removed using techniques that do not use vacuum devices. For example, vacuum press molding devices limit the size of the panels that can be processed to only at most several centimeters. The techniques described herein, on the other hand, can produce rib patterns on large substrates.

In one aspect, the present disclosure provides a method of forming microstructures on a substrate. The method includes disposing a curable material on a substrate, where the curable material includes a viscosity of less than 12,000 cps. The method further includes contacting the curable material with a flexible mold starting at a first end of the substrate and proceeding at a substantially uniform contact speed in a first direction and applying a substantially uniform contact pressure. In addition, the method includes forming the curable material, using the mold, into a lattice pattern, where the lattice pattern includes a first set of ribs aligned in the first direction and a second set of ribs aligned in a second direction substantially orthogonal to the first direction, where the first set of ribs includes a pitch of less than 500 µm. The method further includes curing the curable material, and removing the mold.

In another aspect, the present disclosure provides a microstructured assembly that includes a substrate, and a flexible mold including a microstructured surface that opposes a surface of the substrate. The assembly further includes a curable material disposed between the substrate and the microstructured surface of the flexible mold, where the microstructured surface of the mold is configured to impart a lattice pattern into the curable material. The lattice pattern includes a first set of ribs aligned in a first direction and a second set of ribs aligned in a second direction substantially orthogonal to the first direction, where the first set of ribs includes a pitch of less than 500 µm. The curable material includes a viscosity of less than 12,000 cps. In addition, the curable material is substantially devoid of large bubbles.

The above summary of the present invention is not intended to describe each disclosed embodiment or every implementation of the present invention. The Figures and the detailed description which follow more particularly exemplify these embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Figure 1:
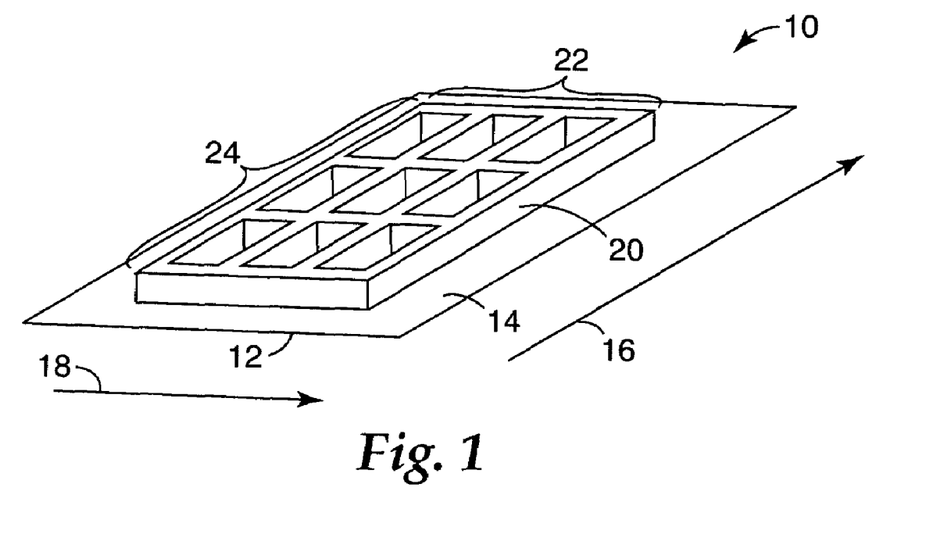
FIG. 1 is a schematic diagram of one embodiment of a lattice pattern barrier rib assembly.

FIG. 1 is a schematic diagram of one embodiment of a lattice pattern barrier rib assembly 10. The assembly 10 includes a substrate 12 and a lattice pattern 20 disposed on a major surface 14 of the substrate 12. The lattice pattern 20 includes a first set of ribs 22 aligned in a first direction 16 and a second set of ribs 24 aligned in a second direction 18. The first direction 16 and the second direction 18 are substantially orthogonal.

In general, plasma display panels (PDPs) can include various substrate elements. The back substrate assembly (e.g., assembly 10), which can be oriented away from the viewer, can include a back substrate (e.g., substrate 12) with independently addressable parallel electrodes (not shown in FIG. 1) formed on or in a major surface of the back substrate. The back substrate can be formed from a variety of compositions, e.g., glass. Microstructures (e.g., lattice pattern 20) are formed on a major surface of the back substrate and include barrier rib portions that are positioned between electrodes and separate areas in which red (R), green (G), and blue (B) phosphors are deposited. PDPs can also include a front substrate assembly that includes a glass substrate and a set of independently addressable parallel electrodes. These front electrodes, also called sustain electrodes, are oriented orthogonally to the back electrodes, also referred to as address electrodes.

In a completed display, the area between the front and back substrate assemblies can be filled with an inert gas. To light up a pixel, an electric field is applied between crossed sustain and address electrodes with enough strength to excite the inert gas atoms therebetween. The excited inert gas atoms emit uv radiation, which causes the phosphor to emit red, green, or blue visible light.

It may be preferred that the back substrate is a transparent glass substrate. Typically, for PDP applications, the back substrate is made of soda lime glass that is optionally substantially free of alkali metals. The temperatures reached during processing can cause migration of the electrode material in the presence of alkali metal in the substrate. This migration can result in conductive pathways between electrodes, thereby shorting out adjacent electrodes or causing undesirable electrical interference between electrodes known as "crosstalk." The front substrate is typically a transparent glass substrate that can have the same or about the same coefficient of thermal expansion as that of the back substrate.

Electrodes are strips of conductive material. The electrodes are formed of a conductive material, e.g., copper, aluminum, or a silver-containing conductive frit. The electrodes can also be a transparent conductive material, such as indium tin oxide, especially in cases where it is desirable to have a transparent display panel. The electrodes are patterned on the back substrate and front substrate. For example, the electrodes can be formed as parallel strips spaced about 120 µm to 360 µm apart, having widths of about 50 µm to 75 µm, thicknesses of about 2 µm to 15 µm, and lengths that span the entire active display area that can range from a few centimeters to several tens of centimeters. In some instances, the widths of the electrodes can be narrower than 50 µm or wider than 75 µm, depending on the architecture of the microstructures.

In some embodiments, barrier ribs portions in PDPs typically have heights of about 120 µm to 140 µm and widths of about 20 µm to 75 µm. It may be preferred that the pitch (number per unit length) of the barrier ribs matches the pitch of the electrodes. In other embodiments, the pitch of the barrier ribs in the mold can be larger or smaller than the pitch of the electrodes, and the mold can be stretched to align the ribs with the electrodes, e.g., as described in U.S. Pat. No. 6,247,986 B1 to Chiu et al., entitled METHOD FOR PRECISE MOLDING AND ALIGNMENT OF STRUCTURES ON A SUBSTRATE USING A STRETCHABLE MOLD.

When using the techniques described herein to form microstructures on a substrate (such as barrier ribs for a PDP), the curable material from which the microstructures are formed can be a slurry or paste, e.g., as described in U.S. Pat. No. 6,352,763 B1 to Dillon et al., entitled CURABLE SLURRY FOR FORMING CERAMIC MICROSTRUCTURES ON A SUBSTRATE USING A MOLD. In an illustrative aspect, the techniques as described herein may include using a slurry that contains a ceramic powder, a curable organic binder, and a diluent, e.g., the slurries described in U.S. Pat. No. 6,352,763 B1. When the binder is in its initial uncured state, the slurry can be shaped and aligned on a substrate using a mold. After curing the binder, the slurry is in at least a semi-rigid state that can retain the shape in which it was molded. This cured, rigid state is referred to as the green state, just as shaped ceramic materials are called "green" before they are sintered. When the slurry is cured, the mold can be removed from the green state microstructures. The green state material can subsequently be debinded and/or fired. Debinding, or burn out, occurs when the green state material is heated to a temperature at which the binder can diffuse to a surface of the material and volatilize. Debinding is usually followed by increasing the temperature to a predetermined firing temperature to sinter or fuse the particles of the ceramic powder. After firing, the material can be referred to as fired material. Fired microstructures are referred to herein as ceramic microstructures.

Generally, the techniques described herein typically use a mold to form the microstructures. The mold may be a flexible polymer sheet having a smooth surface and an opposing microstructured surface. The mold can be made by compression molding of a thermoplastic material using a master tool that has a microstructured pattern. In some embodiments, the mold can also be made of a curable material that is cast and cured onto a thin, flexible polymer film. The microstructured mold can be formed, for example, using techniques disclosed in U.S. Pat. No. 5,175,030 to Lu et al., entitled MICROSTRUCTURE-BEARING COMPOSITE PLASTIC ARTICLES AND METHOD OF MAKING; U.S. Pat. No. 5,183,597 to Lu, entitled METHOD OF MOLDING MICROSTRUCTURE BEARING COMPOSITE PLASTIC ARTICLES; and U.S. Patent Publication No. 2003/0098528 to Chiu et al., entitled METHOD FOR FORMING MICROSTRUCTURES ON A SUBSTRATE USING A MOLD.

Figure 2A:
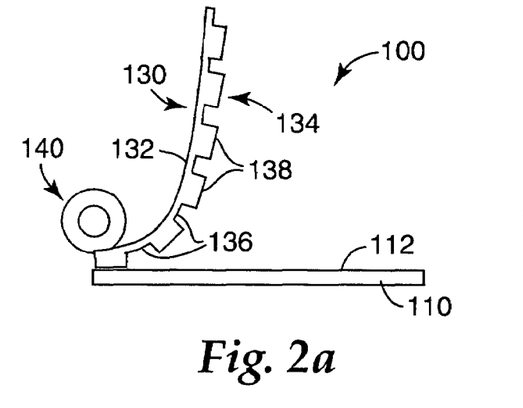
FIGS. 2a-e are schematic diagrams of one embodiment of a method of forming microstructures on a substrate.

FIGS. 2a-e are schematic diagrams of one embodiment of a method of forming microstructures on a substrate. In FIG. 2a, an apparatus 100 for molding microstructures on a substrate is illustrated. The apparatus 100 includes a substrate 110, a flexible mold 130, and a laminating roller 140. The substrate 110 can be any substrate described herein. The flexible mold 130 includes a flexible backing 132 and a microstructured surface 134 on a major surface of the flexible backing 132. The microstructured surface 134 includes rib forming regions 136 and land forming regions 138. The flexible mold 130 in this embodiment is configured and arrayed to form barrier regions (e.g., barrier ribs 124 of FIG. 2e) on substrate 110.

Generally, a roller 140 or other pressure application device can be provided to provide pressure to the mold 130 and a curable material (e.g., curable material 120 of FIG. 2b) to drive a portion of the curable material into rib forming regions 136 within the microstructured surface 134 of the mold 130.

Figure 2B:
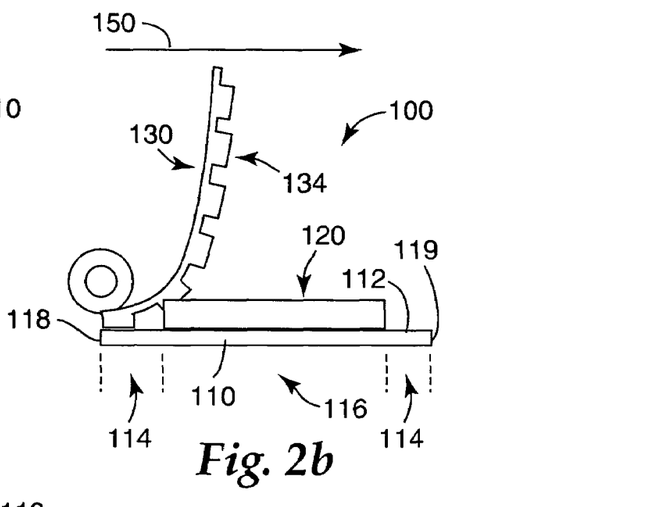

As shown in FIG. 2b, a curable material 120 is disposed on a major surface 112 of substrate 110. Typically, the curable material 120 is coated on the substrate 110 using a coating technique that can produce substantially uniform coatings, e.g., knife coating, screen printing, extrusion coating, and reverse gravure coating. The curable material 120 may include any suitable material or materials as described herein.

The curable material 120 can be coated on one or more regions of the substrate 110. In some embodiments, the curable material 120 can be disposed on substantially the entire major surface 112 of substrate 110. In some embodiments, the curable material 120 may be disposed on region 116 of the substrate. Edge portions 114 of major surface 112 can be left substantially free from curable material 120 to provide areas for handling the substrate or, particularly in the case of PDP and other display technologies, areas free of curable material where sealing to the front panel is performed and electrical connections can be made with electrodes patterned on the substrate (not shown).

Generally, the thickness of the curable material 120 varies by no more than 10%. It may be preferred that the thickness of the curable material 120 varies by no more than 5%. It may be more preferred that the thickness of curable material 120 varies by no more than 2%. In one embodiment, the curable material 120 has an average thickness of about 75 µm. In another embodiment, the average thickness of curable material 120 may be about 50 µm.

It may be preferred that the area of the substrate 110 upon which a lattice pattern is desired (e.g., region 116) has been predetermined precisely beforehand, and the curable material 120 is disposed only upon the area. The area of the substrate 110 having no curable material 120 disposed thereon (e.g., edge portions 114) can be used for handling during processing, and for electrical connections in the case that the assembly is to be used in a PDP.

Figure 2C:
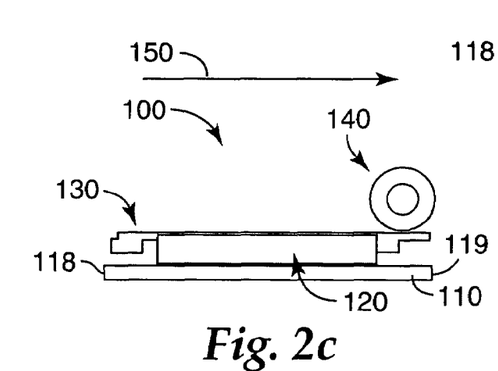

In FIGS. 2b-c, the mold 130 contacts the curable material 120 beginning at a first end 118 of the substrate 110 as pressure is applied to the mold 130 along direction 150. The roller 140 may be used to apply pressure to the mold 130 such that the mold 130 contacts the curable material 120 beginning at the first end 118 of the substrate 110. The mold 130 may be made to contact the curable material 120 at any suitable contact speed in direction 150. It may be preferred that the mold 130 contact curable material 120 at a substantially uniform contact speed. Further, any suitable contact pressure may be applied to mold 130 such that it contacts curable material. It may be preferred that a substantially uniform contract pressure is applied to the mold 130. The curable material 120 is deformed such that the rib forming regions 136 of the microstructured surface 134 of the flexible mold 130 become filled. It may be preferred that the contact speed and contact pressure are chosen such that the curable material 120 is not entirely squeezed out from under the microstructured surface 134 of the flexible mold 130, thus leaving land regions in the curable material 120 corresponding to land forming regions 138 (e.g., land regions 126 of FIG. 2e).

Figure 2D:
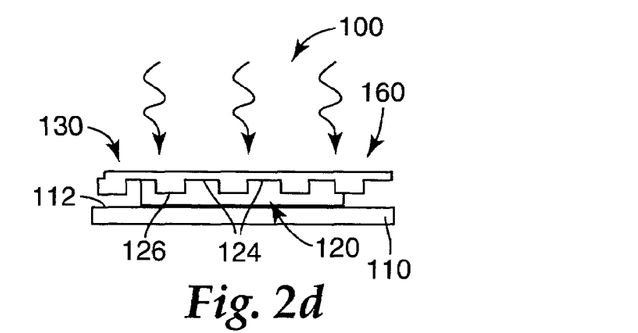
Figure 2E:
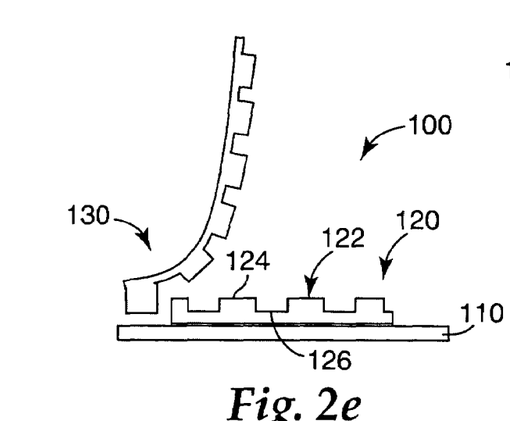

As the mold 130 contacts the curable material 120, the curable material is formed into a lattice pattern (e.g., lattice pattern 20 of FIG. 1). For example, FIG. 2d illustrates one embodiment of a microstructured assembly 160. The microstructured assembly 160 includes the substrate 110, the flexible mold 130, and the curable material 120. The microstructured surface 134 of mold 130 is configured to impart a lattice pattern into the curable material 120. In some embodiments, the lattice pattern includes a first set of ribs (e.g., first set of ribs 22 of FIG. 1) aligned in a first direction (e.g., direction 16 of FIG. 1) and a second set of ribs (e.g., second set of ribs 24 of FIG. 1) aligned in a second direction (e.g., second direction 18 of FIG. 1). Further, the lattice pattern can include land regions 126. As illustrated in FIG. 2d, ribs 124 are included in the second set of ribs, whereas the first set of ribs are not shown.

In FIG. 2d, the curable material 120 is cured to form ribs 124 on major surface 112 of substrate 110. Curing of the material 120 can take place in a variety of ways depending on the binder used. For example, the material can be cured using one or more curing devices providing visible light, ultraviolet light, e-beam radiation, or other forms of radiation, or by heat curing or by cooling to solidification from a melted state. For radiation curing, radiation can be propagated through the substrate 110, through the mold 130, or through the substrate 110 and the mold 130. Preferably, the cure system chosen facilitates adhesion of the cured material 120 to the substrate 110.

After curing the material 120, the mold 130 can be removed (e.g., by winding the mold onto a receiving element, e.g., a roller). A flexible mold can aid in mold removal because the mold can be peeled back so that the demolding force can be focused on a smaller surface area. It may be preferred that a mold release material is included either as a coating on the patterned surface of the mold or in the material that is hardened to form the lattice pattern itself. A mold release material becomes more important as higher aspect ratio structures are formed. Higher aspect ratio structures make demolding more difficult and can lead to damage to the microstructures.

After the mold 130 is removed, what remains is the substrate 110 having a plurality of hardened microstructures adhered thereon. Depending on the application, this can be the finished product. In other applications, such as substrates that will have a plurality of microstructures, the hardened material contains a binder that is preferably removed by debinding at elevated temperatures. After debinding, or burning out of the binder, firing of the green state ceramic microstructures is performed to fuse the glass particles or sinter the ceramic particles in the material of the microstructures. This increases the strength and rigidity of the microstructures. Shrinkage can also occur during firing as the microstructure densifies. Fired microstructures maintain their positions and their pitch according to the substrate pattern.

For PDP display applications, phosphor material is applied between the barrier regions of the microstructures. The substrate then can be installed into a display assembly. This involves aligning a front substrate having sustain electrodes with the back substrate having address electrodes, microstructures, and phosphor such that the sustain electrodes are perpendicular with the address electrodes. The areas through which the opposing electrodes cross define the pixels of the display. The space between the substrates is then evacuated and filled with an inert gas as the substrates are bonded together and sealed at their edges.

It will be recognized that other articles can also be formed using a substrate with the molded microstructures. For example, the molded microstructures can be used to form capillary channels for applications such as electrophoresis plates. In addition, the molded microstructures could be used for plasma displays or other applications that produce light.

As the mold contacts the curable material, air may become trapped between the microstructured surface of the mold and the curable material. This trapped air may in turn form air bubbles within the microstructures formed in the curable material. It may be preferred that any trapped air be removed from between the mold and the curable material.

In the present application, "small bubbles" refers to air bubbles that are less that half the rib height (or other microstructural feature size) in size. The presence of such small bubbles is not preferred, but may not disrupt the continuity of the ribs or other microstructural features, and hence, may not significantly degrade functionality. "Large bubbles" refers to air bubbles which are about half the rib height or larger in size. Large bubbles can disrupt the continuity of the ribs or other microstructural features and significantly degrade functionality. In the present application, the word "defects" refers to damaged ribs or structures, such as broken ribs or ribs with missing sections, as well as to large bubbles.

Figure 3:
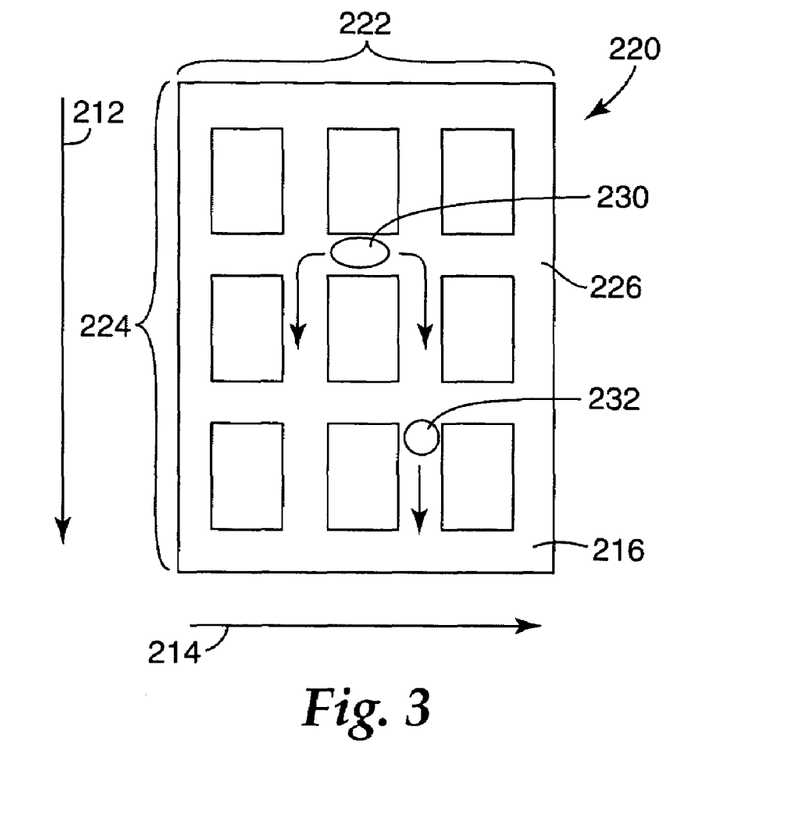
FIG. 3 is a schematic diagram of a path taken by air bubbles as they are removed from a curable material.

One way in which the trapped air can be removed is through grooves that, in some embodiments, form the microstructured surface of the mold. For example, FIG. 3 is a schematic diagram of a path taken by an air bubble as it is removed during the application of a flexible mold having a microstructured surface to a curable material. In FIG. 3, the flexible mold (not shown) is applied in a first direction 212. The lattice pattern 220 that is formed in the curable material 216 includes a first set of ribs 222 aligned in the first direction 212. Lattice pattern 220 further includes a second set of ribs 224 aligned in a second direction 214. A first air bubble 230 is shown schematically within one rib 226 of the second set of ribs 224. For the first air bubble 230 to escape during application of the flexible mold, it must migrate into an area between a rib of the first set of ribs 222 and the mold, so that it can be squeezed out of the curable material 216 along the direction of application of the flexible mold, i.e., the first direction 212. A bubble that has so migrated is shown schematically as second air bubble 232.

One technique that may aid in the removal of trapped air may include controlling certain dimensions of the rib forming regions (i.e., grooves) of a microstructured surface of a mold.

Figure 4A:
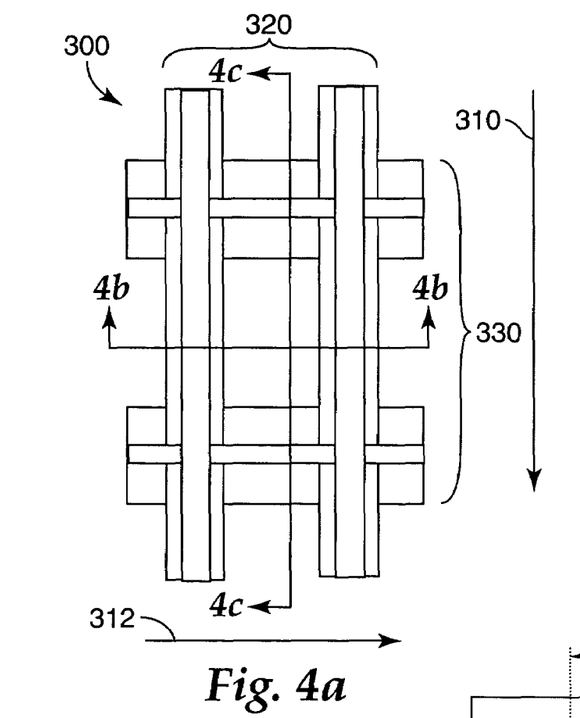
FIGS. 4a-c are schematic diagrams of one embodiment of a flexible mold.

FIGS. 4*a-c* are schematic diagrams of a flexible mold 300. The flexible mold 300 is applied to a curable material in direction 310 as further described herein. The flexible mold 300, which includes a negative image of the lattice pattern to be formed in the curable material, will have rib forming regions where the rib assembly is to have ribs. The mold 300 includes a first set of rib forming regions 320 and a second set of rib forming regions 330. It is to be understood that the rib forming regions 320 and 330 of the mold 300 will form ribs in a curable material that have substantially the same shape and dimensions as the corresponding rib forming regions. Note that the first set of rib forming regions 320 are aligned in the first direction 310 and the second set of rib forming regions 330 are aligned in the second direction 312. In some embodiments, the first set of rib forming regions 320 need not be identical in shape and size to the second set of rib forming regions 330.

Figure 4B:
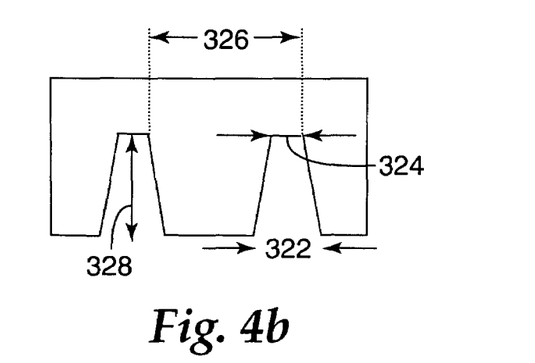
Figure 4C:
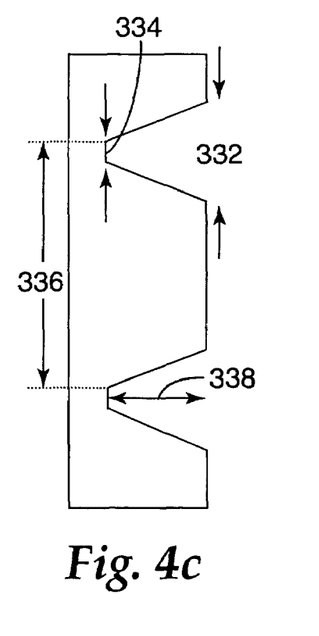

As shown in FIG. 4*b*, each rib forming region of the first set of rib forming regions 320 includes an opening width 322 and a bottom width 324. Further, as shown in FIG. 4*c*, each rib forming region of the second set of rib forming regions 330 includes an opening width of 332 and a bottom width of 334. In other embodiments, the rib forming regions may have opening widths equal in size to the bottom widths. Alternatively, the opening width may be greater than the bottom width for one or more rib forming regions of one of the first set of rib forming regions 320 and second set of rib forming regions 330 or both sets of rib forming regions. Further, the side walls of the rib forming regions may be any suitable shape, e.g., curved, straight, parabolic. The side walls of each rib forming region may also include textured or patterned surfaces.

Each rib forming region of the first set of rib forming regions 320 has a depth 328. Similarly, each rib forming region of the second set of rib forming regions 330 has a depth 338. The depths of each rib forming region may be the same for the first set of rib forming regions 320 or the second set of rib forming regions 330. Alternatively, the depth of each rib forming region of the first set of rib forming regions 320 or the second set of rib forming regions 330 may vary.

Further, each rib forming region of the first set of rib forming regions 320 may have the same shape and dimensions as the rest of the rib forming regions in the first set; alternatively, the rib forming regions of the first set of rib forming regions 320 may have different shapes and dimensions. In other embodiments, the second set of rib forming regions 330 may include rib forming regions that have the same shapes and dimensions, or the rib forming regions may have varying shapes and dimensions.

Each rib forming region of the first set of rib forming regions 320 includes an average width that is one-half the sum of the opening width 322 and the bottom width 324. Similarly, the average width of each rib forming region of the second set of rib forming regions 330 is one-half the sum of the opening width 332 and the bottom width 334. The average width of each rib forming region of the first set of rib forming regions 320 and the average width of each rib forming region of the second set of rib forming regions 320 need not be equal.

The first set of rib forming regions 320 includes a pitch 326, and the second set of rib forming regions 330 includes a pitch 336. The pitch 326 of the first set of rib forming regions 320 and the pitch 336 of the second set of rib forming regions 330 may be equal. In some embodiments, the pitch 326 of the first set of rib forming regions 320 may be greater or less than the pitch 336 of the second set of rib forming regions 330.

Several factors may influence the removal of air bubbles from the curable material. For example, the viscosity of the curable material, the pitch 326 of the first set of rib forming regions 320, and the pitch 336 of the second set of rib forming regions 330 may affect the removal of air bubbles. Other parameters may also have an effect. For example, the ratio of the average width of each rib forming region of the second set of rib forming regions 330 and the average width of each rib forming region of the first set of rib forming regions 320, the shape of the rib forming regions, and the coated thickness of the curable material may influence bubble formation and removal. Another such parameter is the application (roller) loading or pressure as the flexible mold is being applied to the curable material and the speed or rate of the application (roller travel).

To aid in preventing bubble formation, it may be preferred that the viscosity of the curable material is less than 12,000 cps. Further, it may be preferred that the pitch of the first set of rib forming regions 320 is less than 500 µm. It may be more preferred that the pitch of the first set of rib forming regions is less than 300 µm.

Further, it may be preferred that the ratio of the average width of each rib forming region of the second set of rib forming regions 330 and the average width of each rib forming region of the first set of rib forming regions is at least 1.5. Without wishing to be bound by any theory, it is believed that widening each rib forming region of the second set of rib forming regions 330 with respect to the width of each rib forming region of the first set of rib forming regions 320 alters the pressure drops in the respective channels during application of the flexible mold in such a way as to enable ever-smaller bubbles to escape by the route shown schematically in FIG. 3. One skilled in the art will appreciate that increasing the value of the ratio of the average width of each rib forming region of the second set of rib forming regions and the average width of each rib forming region of the first set of rib forming regions beyond 1.5 will lead progressively to the elimination of smaller and smaller air bubbles, if desired.

Also, the length of the path an air bubble must traverse in order to escape by the route shown schematically in FIG. 3 may further influence the removal of air bubbles from the curable material. For example, the edge-to-edge bottom distance of the first set of rib forming regions 320 may in some instances be less than 150 µm or more than 300 µm. One skilled in the art will appreciate that if this distance is less than 150 µm, the value of the ratio of the average width of each rib forming region of the second set of rib forming regions 330 and the average width of each rib forming region of the first set of rib forming regions 320 effective for bubble removal may be lower than 1.5. Conversely, if the distance is greater than 300 µm, the value of this ratio necessary for effective bubble removal may be greater than 1.5.

Another factor that may influence bubble removal is the quantity of curable material disposed on the substrate prior to the flexible mold contacting the curable material. As further described herein, the curable material is disposed on the substrate in an area of the substrate upon which the lattice rib pattern is intended to be formed (e.g., region 116 of substrate 110 as illustrated in FIG. 2b). Conditions may be selected such that the amount of curable material squeezed out from under the microstructured surface of the flexible mold is substantially equal to the amount of curable material squeezed up into the rib forming regions of the microstructured surface. The first set of rib forming regions, which correspond to the first set of ribs aligned in the first direction, provide an air channel by which air bubbles can escape.

If, however, the amount of curable material squeezed out from under the microstructured surface of the flexible mold is substantially in excess of the amount of curable material squeezed up into the rib forming regions, a bank of curable material may be formed ahead of the advance of the flexible mold. This results in a "paste overflow" condition. When the bank is created, one or more rib forming regions of the second set of rib forming regions (e.g., second set of rib forming regions 330 of FIG. 4a) become filled out of sequence. The first set of rib forming regions provides an air channel by which air bubbles can escape (see, e.g., FIG. 3). However, when one or more rib forming regions of the second set of rib forming regions become filled out of sequence, this air channel provided by the first set of rib forming regions becomes blocked; therefore, some of the air bubbles may not completely escape.

Not only may the amount of curable material disposed on the substrate affect air bubble removal, the viscosity of the curable material along with the pressure or loading applied by the roller, and the speed at which the roller travels may also affect air bubble removal. For example, too low a viscosity for the curable material can also lead to paste overflow.

EXAMPLES

Example 1

A metal mold was prepared to the desired dimensions of the lattice pattern assembly to be made. The metal mold includes a microstructured surface having a first set of rib forming regions aligned in a first direction and a second set of rib forming regions aligned in a second direction substantially orthogonal to the first direction. The first set of rib forming regions had a pitch of 300 µm. Each rib forming region of the first set of rib forming regions had a height of 208 µm, an opening width of 55 µm, and a bottom width of 115 µm. The dimension of these rib forming regions would form a rib having a taper angle of 82 degrees. The taper angle is the included angle at the base of a rib. A rib forming region with equal opening and bottom widths would form a rib having a taper angle of 90 degrees. The second set of rib forming regions had a pitch of 500 µm. Each rib forming region had a height of 208 µm, an opening width of 37 µm, and a bottom width of 160 µm, which would result in a rib taper angle of 75 degrees.

A mixture of 99% by wt. of an aliphatic urethane acrylate oligomer (Photomer 6010™, manufactured by Henkel Co.) and 1% by wt. 2-hydroxyl-2-methyl-1-phenyl-propane-1-one (Darocure 1173™, manufactured by Ciba-Gigy) as a photoinitiator was prepared. An amount slightly in excess of that needed to completely fill the microstructured surface of the mold was placed between a PET film and the metal mold. The mixture was cured by exposure to radiation of wavelength 300-400 nm for 30 sec. The thus-cured urethane acrylate polymer adhered strongly to the PET film and was released together with the PET film from the metal mold to obtain a flexible and transparent plastic mold. The rib forming regions in the flexible mold had the same shape and the same dimensions as the rib forming regions in the metal mold.

A ceramic paste was prepared to serve in the molding method as the curable material. 21.0 g of dimethacrylate of bisphenol A diglycidyl ether (Kyoeisha Chemical Co., Ltd.), 9.0 g of triethylene glycol dimethacrylate (Wako Pure Chemical Industries, Ltd.), 30.0 g of 1,3-butandiol (Wako Pure Chemical Industries, Ltd.) as a dilutant, 0.3 g of bis(2,4,6-trimethylbenzoyl)-phenylphospheneoxide (Irgacure 819, made by Ciba-Geigy) as an initiator, 3.0 g of phosphated polyoxyalkyl polyol (POCA) as a surfactant, and 180.0 g of a mixture of glass frit and ceramic particles (RFW-030, made by Asahi Glass Co) were mixed to obtain the photocurable ceramic paste. The paste viscosity was 6000 cps (as measured at 22° C. and 20 rpm with spindle No. 5 on a type B viscometer).

The ceramic paste was coated onto a glass substrate to a thickness of 200 μm, and then the flexible mold was applied in a first direction, with a roller, onto the paste. Afterwards, the assembly was exposed to radiation of wavelength 400-500 nm for 30 s to cure the paste. The flexible mold was peeled from the substrate in the first direction. The substrate and cured ribs assembly was then sintered at 550° C. for 1 h to burn out the organic part of the ribs. After the sintering, the ribs were evaluated using an optical microscope. Either damage to a rib or a bubble in a rib that was so large as to significantly disrupt the continuity of the rib were regarded as defects. Sometimes, very small air bubbles are observed on the very tops of the lateral ribs. These small air bubbles are approximately an order of magnitude smaller than the heights of the ribs, so they do not significantly disrupt the continuity of the rib. No defects were observed in this specimen. Small air bubbles were observed in this specimen.

Defect level in this and other Examples was defined as a ratio of the number of defects detected to the number of rib segments of the set of second direction ribs in the visual field (7.5 mm in diameter) of the microscope. This measurement was done in seven randomly-selected areas on the specimen, and the average of the seven results is reported. The defect level of Example 1 was 0.0%.

Examples 2 and 3

The flexible molds were made as described in Example 1. The viscosity of the paste was varied by varying the solids content (glass frit and ceramic particles). Solids content was 90.0 g in Example 2 and 145.0 g in Example 3. All other components were identical in type and loading level as those in Example 1. The paste viscosities were 1800 cps for Example 2 and 4800 cps for Example 3.

Lattice pattern rib assemblies were made in the same way as in Example 1. The defect level was measured by microscopy. The defect levels of both Examples 2 and 3 were 0.0%. Small bubbles were observed in these specimens.

Comparative Examples 1 and 2

The flexible molds were made as described in Example 1. The viscosity of the paste was varied by varying the solids content (glass frit and ceramic particles). Solids content was 220.0 g in Comparative Example 1 and 270.0 g in Comparative Example 2. All other components were identical in type and loading level as in Example 1. The paste viscosities were 12,600 cps for Comparative Example 1 and 27,300 cps for Comparative Example 2.

Lattice pattern rib assemblies were made in the same way as in Example 1. The defect level was measured by microscopy. The defect levels were 0.1% for Comparative Example 1 and 3.3% for Comparative Example 2. Small bubbles were also observed in these specimens.

Comparative Example 3

A flexible mold and a ceramic paste were made as described in Example 1, with the exception that the first direction and second direction of the mold were reversed. Thus, the pitch in the first direction was 500 μm. The paste viscosity was 6000 cps. Lattice pattern rib assemblies were made in the same way as in Example 1.

The defect level was measured by microscopy. Many defects were observed in this specimen. All cross members included defects, which means that the defect level is 100% in Comparative Example 3. Small bubbles were also observed in this specimen.

Example 4

A flexible plastic mold having lattice pattern microstructured surface was prepared using the same materials as in Example 1.

The microstructured surface in the mold corresponded to ribs having the following dimensions. Ribs of the first set of ribs had a pitch of 300 μm, a height of 200 μm, an opening width of 50 μm, and a bottom width of 100 μm. The ribs of the second set of ribs had a pitch of 500 μm, a height of 200 μm, an opening width of 150 μm, and a bottom width of 220 μm.

The average width of each rib of the first set of ribs was thus (50+100)/2=75 and, the average width of each rib of the second set of ribs was thus (150+220)/2=185. The ratio of the average width of each rib of the second set of ribs and the average width of each rib of the first set of ribs was thus 185/75, or about 2.5.

A ceramic paste was prepared to serve in the molding method as the curable material. 21.0 g of dimethacrylate of bisphenol A diglycidyl ether (Kyoeisha Chemical Co., Ltd.), 9.0 g of triethylene glycol dimethacrylate (Wako Pure Chemical Industries, Ltd.), 30.0 g of 1,3-butandiol (Wako Pure Chemical Industries, Ltd.) as a dilutant, 0.2 g of bis(2,4,6-trimethylbenzoyl)-phenylphospheneoxide (Irgacure 819, made by Ciba-Geigy) as an initiator, 1.5 g of phosphateed polyoxyalkyl polyol (POCA) and 1.5 g of sodium dodecylbenzenesulfonate (NeoPelex #25, made by Kao Co.) as surfactants, and 270.0 g of a mixture of glass frit and ceramic particles (RFW-030, made by Asahi Glass Co) were mixed to obtain the photocurable ceramic paste. The paste viscosity was 7300 cps (as measured at 22° C. and 20 rpm with spindle No. 5 on a type B viscometer).

The ceramic paste was coated on a glass substrate to a thickness of 130 μm by a blade coater, and then the flexible mold was applied along the first direction onto the paste using a rubber roller.

Afterwards, the assembly was exposed to radiation of wavelength 400-500 nm for 30 s to cure the paste. The flexible mold was peeled from the substrate in the first direction.

The sizes of air bubbles near the tops of the ribs of the second set of ribs were measured at 18 points by microscopy. The average air bubble size is summarized in Table 1. No defects or small air bubbles were observed in Example 4.

Examples 5 and 6

Flexible plastic molds having different rib forming region shapes from Example 4 were prepared.

The rib shapes corresponding to those rib forming region shapes are described as follows.

Example 5

Ribs of the first set of ribs had a pitch of 300 μm, a height of 200 μm, an opening width of 50 μm, and a bottom width of 100 μm. The ribs of the second set of ribs had a pitch of 500 μm, a height of 200 μm, an opening width of 125 μm, and a bottom width of 190 μm.

The average width of each rib of the first set of ribs was thus (50+100)/2=75 and, the average width of each rib of the second set of ribs was thus (125+190)/2=157.5. The ratio of the average width of each rib of the second set of ribs and the average width of each rib of the first set of ribs was thus 157.5/75=2.1.

Example 6

Ribs of the first set of ribs had a pitch of 300 μm, a height of 200 μm, an opening width of 50 μm, and a bottom width of 100 μm. The ribs of the second set of ribs had a pitch of 500 μm, a height of 200 μm, an opening width of 100 μm, and a bottom width of 170 μm.

The average width of each rib of the first set of ribs was thus (50+100)/2=75 and, the average width of each rib of the second set of ribs was thus (100+170)/2=135. The ratio of the average width of each rib of the second set of ribs and the average width of each rib of the first set of ribs is thus 135/75=1.8.

The lattice pattern ribs were formed by using the mold as described in Example 4. The sizes of air bubble near the tops of the ribs of the second set of ribs were measured at 18 points by microscopy. The average air bubble size is summarized in Table 1. No defects or small air bubbles were observed in Example 5 or 6.

Examples 7 and 8

Flexible plastic molds that have different rib forming region shapes from Example 4 were prepared.

The rib shapes corresponding to those rib forming region shapes are described as follows.

Example 7

Ribs of the first set of ribs had a pitch of 300 μm, a height of 200 μm, an opening width of 50 μm, and a bottom width of 100 μm. The ribs of the second set of ribs had a pitch of 500 μm, a height of 200 μm, an opening width of 75 μm, and a bottom width of 140 μm.

The average width of each rib of the first set of ribs was thus (50+100)/2=75 and, the average width of each rib of the second set of ribs was thus (75+140)/2=107.5. The ratio of the average width of each rib of the second set of ribs and the average width of each rib of the first set of ribs was thus 107.5/75=1.4.

Example 8

Ribs of the first set of ribs had a pitch of 300 μm, a height of 200 μm, an opening width of 60 μm, and a bottom width of 120 μm. The ribs of the second set of ribs had a pitch of 500 μm, a height of 200 μm, an opening width of 60 μm, and a bottom width of 110 μm.

The average width of each rib of the first set of ribs is thus (60+120)/2=90 and, the average width of each rib of the second set of ribs is thus (60+110)/2=85. The ratio of the average width of each rib of the second set of ribs and the average width of each rib of the first set of ribs is thus 85/90=0.94.

The lattice pattern ribs were formed by using the mold as described in Example 4. The sizes of air bubbles near the tops of the ribs of the second set of ribs were measured at 18 points by microscopy. The average air bubble size is summarized in Table 1. The average sizes of air bubbles were 18 μm and 25 μm in examples 7 and 8, respectively. No defects were observed in these specimens, however.

TABLE 1

|  | Ratio | Air bubble size |
| --- | --- | --- |
| Example 4 | 2.5 | 0 micron |
| Example 5 | 2.1 | 0 micron |
| Example 6 | 1.8 | 0 micron |
| Example 7 | 1.4 | 18 micron |
| Example 8 | 0.9 | 25 micron |

Example 9

A metal mold was prepared to the desired dimensions of the lattice pattern assembly to be made. The metal mold includes a microstructured surface having a first set of rib forming regions aligned in a first direction and a second set of rib forming regions aligned in a second direction substantially orthogonal to the first direction. The first set of rib forming regions had a pitch of 300 μm. Each rib forming region of the first set of rib forming regions had a height of 200 μm, an opening width of 60 μm, and a bottom width of 120 μm. The second set of rib forming regions had a pitch of 500 μm, a height of 200 μm, an opening width of 40 μm, and a bottom width of 160 μm, resulting in a rib taper angle of 75 degrees.

A mixture of 99% by wt. of an aliphatic urethane acrylate oligomer (Photomer 6010™, manufactured by Henkel Co.) and 1% by wt. 2-hydroxyl-2-methyl-1-phenyl-propane-1-one (Darocure 1173™, manufactured by Ciba-Gigy) as a photoinitiator was prepared. An amount slightly in excess of that needed to completely fill the microstructure of the mold was placed between a PET film and the metal mold. The mixture was cured by exposure to radiation of wavelength 300-400 nm for 30 sec. The thus-cured urethane acrylate polymer adheres strongly to the PET film, and was released together with the PET film from the metal mold to obtain a flexible and transparent plastic mold. The grooves in the flexible mold had the same shape and the same dimensions as the ribs in the metal mold.

A ceramic paste was prepared to serve in the molding method as the curable material. 21.0 g of dimethacrylate of bisphenol A diglycidyl ether (Kyoeisha Chemical Co., Ltd.), 9.0 g of triethylene glycol dimethacrylate (Wako Pure Chemical Industries, Ltd.), 30.0 g of 1,3-butandiol (Wako Pure Chemical Industries, Ltd.) as a dilutant, 0.2 g of bis(2,4,6-trimethylbenzoyl)-phenylphospheneoxide (Irgacure 819, made by Ciba-Geigy) as an initiator, 1.5 g of phosphateed polyoxyalkyl polyol (POCA) and 1.5 g of sodium dodecylbenzenesulfonate (NeoPelex #25, made by Kao Co.) as surfactants, and 270.0 g of a mixture of glass frit and ceramic particles (RFW-030, made by Asahi Glass Co) were mixed to obtain the photocurable ceramic paste. The paste viscosity was 7300 cps (as measured at 22° C. and 20 rpm with spindle No. 5 on a type B viscometer).

The ceramic paste was coated on a glass substrate to a thickness of 110 μm by a blade coater. The coating area was a 950×540 mm rectangle that corresponded to the lattice pattern area of the mold. Then the flexible mold was applied along the first direction onto the 110 micron thick layer of paste by using a 30 kg, 200 mm diameter roller at a rate of 42 mm/s. Since no additional loading was given to the mold, the total loading to the mold is 30 kg/950 mm, or about 0.032 kg/mm. Afterwards, the assembly was exposed to radiation of wavelength 400-500 nm for 30 s to cure the paste. The flexible mold was peeled from the substrate in the first direction.

The amount of paste overflow resulting from the application step was obtained by measuring the difference between the paste coating area before the application of the flexible mold and the paste coating area after the application of the flexible mold. The specimen of Example 9 showed no difference in paste coating area before and after the application of the flexible mold, which indicates that the conditions of Example 9.

After the removal of the mold, the assembly of substrate and lattice pattern ribs was sintered at 550° C. for 1 h to burn out the organic part of the ribs.

After the sintering, rib defects were measured by optical microscopy. No defects were observed in the entire area (950×540 mm) of the specimen of Example 9. Small air bubbles were observed in this specimen.

Examples 10 and 11

The flexible plastic molds and photocurable ceramic paste were made as described in Example 9.

The ceramic paste was coated on a glass substrate to a thickness of 110 μm by a blade coater. The coating area was a 950×540 mm rectangle that corresponded to the lattice pattern area of the mold. Then the flexible mold was applied along the first direction onto the 110 micron thick layer of paste. For Example 10, a 30 kg, 200 mm diameter roller was used at a rate of 20 mm/s. For Example 11, a 100 kg, 200 mm diameter roller was used at a rate of 42 mm/s. Since no additional loading was given to the mold, the total loading to the mold is 30 kg/950 mm, or about 0.032 kg/mm for Example 10, and is 100 kg/950 mm, or about 0.105 kg/mm for Example 11. Afterwards, the assembly was exposed to radiation of wavelength 400-500 nm for 30 s to cure the paste. The flexible mold was peeled from the substrate in the first direction.

The amount of paste overflow resulting from the application step was obtained by measuring the difference between the paste coating area before the application of the flexible mold and the paste coating area after the application of the flexible mold. The specimens of Examples 10 and 11 showed no difference in paste coating area before and after the application of the flexible mold, which indicates that the conditions of Examples 10 and 11 did not lead to "paste overflow" conditions.

After the removal of the mold, the assembly of substrate and lattice pattern ribs was sintered at 550° C. for 1 h to burn out the organic part of the ribs.

After the sintering, rib defects were measured by optical microscopy. No defects were observed in the entire area (950×540 mm) of the specimens of Examples 10 and 11. Small air bubbles were observed in these specimens.

Comparative Example 4

The flexible plastic molds were made as described in Example 9. The paste viscosity was lowered by decreasing the content of the RFW-030 in the paste. 180.0 g of RFW-030 was used instead of the 270.0 g used in Example 9. The amounts of all other ingredients of the paste were identical. The viscosity was 3000 cps.

The ceramic paste was coated on a glass substrate to a thickness of 110 μm by a blade coater. The coating area was a 950×540 mm rectangle that corresponded to the lattice pattern area of the mold. Then the flexible mold was applied along the first direction onto the 110 micron thick layer of paste by using a 100 kg, 200 mm diameter roller at a rate of 20 mm/s. Since no additional loading was given to the mold, the total loading to the mold is 100 kg/950 mm, or about 0.105 kg/mm. Afterwards, the assembly was exposed to radiation of wavelength 400-500 nm for 30 s to cure the paste. The flexible mold was peeled from the substrate in the first direction.

The amount of paste overflow resulting from the application step was obtained by measuring the difference between the paste coating area before the application of the flexible mold and the paste coating area after the application of the flexible mold. The specimen of Comparative Example 4 showed a difference in paste coating area before and after the application of the flexible mold of more than 50 mm in the first direction, which indicates that the conditions of Comparative Example 4 can be said to be "paste overflow" conditions.

After the removal of the mold, the assembly of substrate and lattice pattern ribs was sintered at 550° C. for 1 h to burn out the organic part of the ribs.

After the sintering, rib defects were measured by optical microscopy. More than 100 defects were observed in the entire area (950×540 mm) of the specimen Comparative Example 4. Small air bubbles were also observed in this specimen.

All references and publications cited herein are expressly incorporated herein by reference in their entirety into this disclosure. Illustrative embodiments of this invention are discussed and reference has been made to possible variations within the scope of this invention. These and other variations and modifications in the invention will be apparent to those skilled in the art without departing from the scope of the invention, and it should be understood that this invention is not limited to the illustrative embodiments set forth herein. Accordingly, the invention is to be limited only by the claims provided below.

What is claimed is:

1. A method of forming microstructures on a substrate, the method comprising:
   disposing a curable material on a substrate, wherein the curable material comprises a viscosity of less than 12,000 cps;

contacting the curable material with a flexible mold starting at a first end of the substrate and proceeding at a substantially uniform contact speed in a first direction and applying a substantially uniform contact pressure;

forming the curable material, using the mold, into a lattice pattern, wherein the lattice pattern comprises a first set of ribs aligned in the first direction and a second set of ribs aligned in a second direction substantially orthogonal to the first direction, wherein the first set of ribs comprises a pitch of less than 500 μm, the ribs of each set have an average width, and the average width of the second set of ribs to the average width of the first set of ribs has a ratio of at least 1.5;

curing the curable material; and removing the mold;

and firing the curable material after removing the mold.

2. The method of claim 1, wherein the fired curable material is substantially devoid of defects.

3. The method of claim 1, wherein the pitch of the first set of ribs is less than 300 μm.

4. The method of claim 1, wherein a plurality of ribs of the first set of ribs are connected by intervening land regions, and further wherein the intervening land regions comprise a substantially uniform center thickness.

5. The method of claim 1, wherein a plurality of ribs of the second set of ribs are connected by intervening land regions, and further wherein the intervening land regions comprise a substantially uniform center thickness.

6. The method of claim 1, wherein the curable material comprises a ceramic material.

7. The method of claim 1, wherein contacting the curable material comprises unrolling the flexible mold while contacting the curable material starting at the first end of the substrate.

8. The method of claim 7, wherein removing the flexible mold comprises rolling the flexible mold onto a receiving element.

9. The method of claim 1 wherein the curable material contains a ceramic power, a curable organic binder, and a diluent.

10. The method of claim 1 wherein the first and second set of ribs have an average width ranging from 20 μm to 50 μm.

11. The method of claim 1 wherein the curable material is disposed on substantially an entire major surface of the substrate.

12. The method of claim 11 wherein the curable material is disposed on the substrate at a thickness that varies by no more than 10%.

13. The method of claim 11 wherein the curable material is disposed on the substrate at a thickness that varies by no more than 5%.

14. The method of claim 11 wherein the curable material is disposed on the substrate at a thickness that varies by no more than 2%.

15. The method of claim 1 wherein the curable material is radiation cured by propagating radiation through the substrate or through the mold.

16. The method of claim 1 wherein the mold is a transparent plastic mold.

17. The method of claim 1 wherein the mold is a flexible polymer sheet having a smooth surface and an opposing microstructured surface.

* * * * *

UNITED STATES PATENT AND TRADEMARK OFFICE
CERTIFICATE OF CORRECTION

PATENT NO. : 7,288,013 B2
APPLICATION NO. : 10/698200
DATED : October 30, 2007
INVENTOR(S) : Chikafumi Yokoyama It is certified that error appears in the above-identified patent and that said Letters Patent is hereby corrected as shown below:

Column 12
Line 57, Delete "phosphateed" and insert -- phosphated --, therefor.

Column 15
Line 7, Delete "phosphateed" and insert -- phosphated --, therefor.

Column 18
Line 5, In Claim 9, delete "power," and insert -- powder, --, therefor.

Signed and Sealed this

Fifteenth Day of April, 2008

JON W. DUDAS
*Director of the United States Patent and Trademark Office*